June 12, 1923.
C. H. KIRBY
1,458,581
STEERING GEAR REPLACEMENT
Filed June 15, 1918
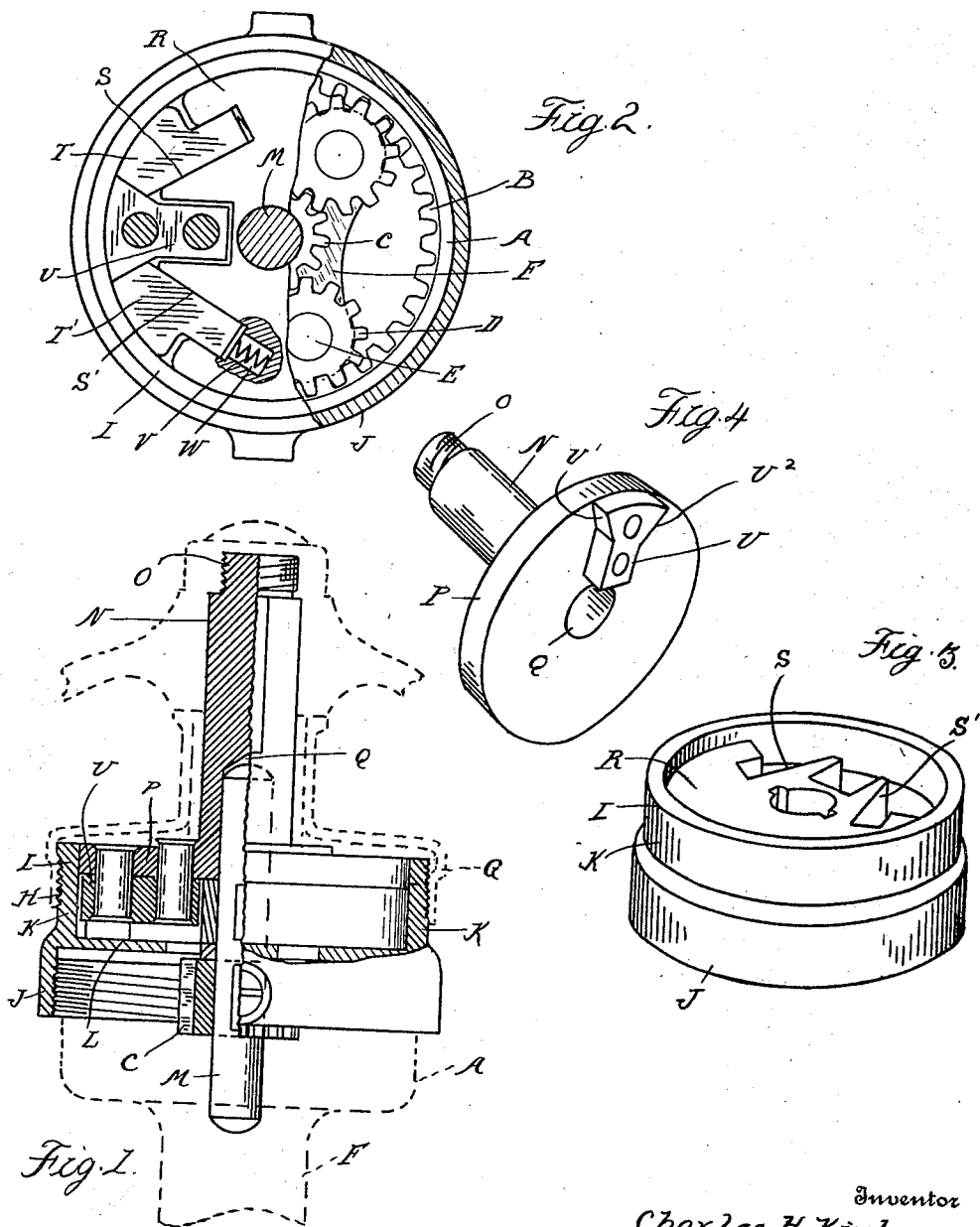
Inventor
Charles H. Kirby
By Whittemore Hulbert + Whittemore
Attorneys Patented June 12, 1923.

1,458,581

UNITED STATES PATENT OFFICE.

CHARLES H. KIRBY, OF DETROIT, MICHIGAN.

STEERING-GEAR REPLACEMENT.

Application filed June 15, 1918. Serial No. 240,197.

*To all whom it may concern:*

Be it known that I, CHARLES H. KIRBY, a citizen of the United States of America, residing at Detroit, in the county of Wayne and State of Michigan, have invented certain new and useful Improvements in Steering-Gear Replacements, of which the following is a specification, reference being had therein to the accompanying drawings.

The invention relates to steering gears of that type in which the mechanism intermediate the steering wheel and the axle spindles is not irreversible, and more particularly the invention relates to the type of steering gear employed on the "Ford" car. It is the object of the invention to provide an inexpensive replacement for a portion of the mechanism to convert the same into a substantially irreversible type, and to this end the invention comprises the novel construction as hereinafter set forth.

In the drawings:

Figure 1 is a sectional elevation of the steering gear, showing the replacement elements in full lines and the cooperating elements of the original construction in dotted lines.

Figure 2 is a cross-section;

Figures 3 and 4 are perspective views showing some of the elements detached.

With steering gears of the type used on the "Ford" car and other similar constructions, the rotation of the steering wheel is communicated to the steering spindle through the medium of a planetary gearing system, which forms in effect a reversible step-down transmission. Thus while there is an increase in power in the transmission from the steering wheel to the axle there is nothing to prevent a reverse transmission and consequently severe road shocks react upon the steering wheel with a loss of control. To render this mechanism substantially irreversible I have provided a friction brake which, while permitting free movement of the mechanism when actuated by the steering wheel, resists reverse transmission.

In detail, A is the housing at the upper end of the steering spindle of a "Ford" car, which contains the standard planetary transmission including the annular rack B on the interior of the case, the central pinion C and the intermediate planetary pinions D, the latter being journalled on pins E mounted on the head F secured to the rotating stem. In the standard construction the pinion C is formed integral with an upwardly-extending spindle upon which the steering wheel is directly mounted and a detachable cap G engaging a threaded portion H of the casing A serves to close the housing and to form a journal for the steering wheel spindle. My improved construction replaces the spindle and pinion C and interposes between the steering wheel and the planetary transmission, mechanism of the following construction:

I is a housing member having an interiorly-threaded, downwardly-extending flange J for engagement with the threaded portion H of the housing A. K is an upwardly-extending portion which is exteriorly threaded to receive the cap G, and intermediate the portions J and K is an inwardly-extending flange or ledge L. C is the pinion which replaces the pinion of the standard construction, but instead of being integral with the spindle is keyed upon a replacement spindle M, the lower end of which engages the socket in the standard member F. N is a spindle member corresponding to the standard spindle, on which the steering wheel is mounted, and provided with a similar threaded portion O for engaging the securing nut. The lower end of this spindle N is provided with a circular head P for fitting within the housing I, and this head and the spindle are centrally recessed at Q for receiving the upper end of the spindle M. Intermediate the head P and the planetary gearing is arranged a member R which rests upon the flange or ledge L, and which is splined to the spindle M, thereby rotatively coupling the same to the pinion C. The member R is cut away to form inclined bearings S and S' for engaging friction shoes T and T', said shoes having segmental faces for frictionally engaging the inner face of the flange K. The arrangement is such that a rotation of the member R in either direction will cause a frictional engagement of one or the other of the shoes T and T' with the flange K so as to resist movement without absolutely locking. In other words the angles of the faces S and S' are so selected as to be slightly outside of the angle of friction but so near to this angle as to interpose a large element of frictional resistance. U is a lug depending from the head P intermediate the dogs T and T' and having angling faces U' and U² for bearing against the ends of said dogs. V are springs for pressing against the opposite ends of said dogs, being located in recesses W in the member R.

To change over the standard construction so as to form my improved gear, the steering wheel with its spindle and cap G are removed. The cap G is then engaged with the threaded portion K of the housing I, this housing containing the member R, T, T' and head P; also the spindle M with the pinion C thereon. The assembly may then be engaged with the housing A by securing the flange J upon the threaded portion H, the lower part of the spindle M engaging the recess in the member F. The steering wheel is then mounted upon the upper end of the spindle N, which completes the assembly.

In operation, whenever the steering wheel is turned in either direction motion will be transmitted through the spindle N to the head P and through the depending lug U on said head will press against one or the other of the dogs T and T' so as to move the same out of frictional engagement with the flange K. The dog thus engaged is the one which would otherwise lock, by a movement of the member R in the direction in which the wheel is turned, so that all frictional resistance is removed and the motion of the steering wheel will be transmitted to the member R and from the latter to the spindle M and pinion C. From this point on the mechanism is the same as the standard construction and therefore the ground wheels will be turned in the usual way. On the other hand, whenever the ground wheels are subjected to shocks which tend to turn the same, such shocks can be transmitted in the reverse direction through the mechanism described as far as the member R; but any rotative movement of this member R will cause the friction engagement of one or the other of the dogs T and T'. The friction is sufficient to destroy the power of the shock while still permitting a yielding movement so as to avoid breaking any part of the mechanism.

What I claim as my invention is:

1. The combination with a steering wheel and a steering stem, of a yieldable element transmitting the normal drive from said wheel to said stem and a stationary element frictionally engaged by said yieldable element when the stem is subject to a driving stress from a source other than the wheel, said yieldable element being mounted for movement at an angle to said stationary element selected to interpose a large element of frictional resistance to a driving stress transmitted from the stem without absolute locking.

2. The combination with a steering wheel and of a steering stem, of a wedge shaped frictional dog normally transmitting the drive from the wheel to the stem, said dog being yieldable under stress of a drive transmitted from the stem, and a stationary member frictionally engaged by said dog upon yielding thereof to oppose the drive from the stem, said dog being mounted for movement at an angle to said stationary member slightly outside of the angle of friction but sufficiently near that angle to interpose a large element of frictional resistance to a drive from the stem.

3. The combination with a steering wheel and a steering stem, of a casing adjacent said wheel and stem, a mechanism within said casing for actuating the stem from the wheel including a driving element connected to the wheel, and a pair of sliding dogs engageable by said driving element at each side thereof and respectively yieldable under pressure of said driving element, according to the direction of rotation of the latter, said dogs being urged into engagement with a peripheral wall of said casing and being mounted for movement at an angle to said casing slightly outside the angle of friction.

In testimony whereof I affix my signature.

CHARLES H. KIRBY.